(12) United States Patent
Leblanc et al.

(10) Patent No.: US 12,040,098 B2
(45) Date of Patent: Jul. 16, 2024

(54) EXTERNAL CLOSED-LOOP NUCLEAR REACTOR COOLING ASSEMBLY ENCLOSED IN A PROTECTIVE STRUCTURE

(71) Applicant: TERRESTRIAL ENERGY INC., Oakville (CA)

(72) Inventors: David Leblanc, Ottawa (CA); Anthonius C. Rodenburg, Mississauga (CA); John Handbury, Oakville (CA)

(73) Assignee: TERRESTRIAL ENERGY, INC., Oakville (CA)

(*) Notice: Subject to any disclaimer, the term of this patent is extended or adjusted under 35 U.S.C. 154(b) by 459 days.

(21) Appl. No.: 17/297,036

(22) PCT Filed: Nov. 27, 2019

(86) PCT No.: PCT/CA2019/051692
§ 371 (c)(1),
(2) Date: May 26, 2021

(87) PCT Pub. No.: WO2020/107109
PCT Pub. Date: Jun. 4, 2020

(65) Prior Publication Data
US 2021/0398697 A1 Dec. 23, 2021
US 2022/0375635 A9 Nov. 24, 2022

Related U.S. Application Data

(60) Provisional application No. 62/771,912, filed on Nov. 27, 2018.

(51) Int. Cl.
*G21C 15/14* (2006.01)
*G21C 15/18* (2006.01)
(Continued)

(52) U.S. Cl.
CPC ............. *G21C 15/14* (2013.01); *G21C 15/18* (2013.01); *G21C 11/00* (2013.01); *G21C 13/02* (2013.01); *G21C 15/22* (2013.01)

(58) Field of Classification Search
CPC ........ G21C 15/14; G21C 15/18; G21C 15/22; G21C 13/02; G21C 11/00
(Continued)

(56) References Cited

U.S. PATENT DOCUMENTS

| 5,223,210 A | 6/1993 | Hunsbedt et al. |
| 2020/0027594 A1* | 1/2020 | Hunt ...................... G21C 15/18 |

FOREIGN PATENT DOCUMENTS

| GB | 2046981 A | 11/1980 |
| WO | 2017127937 A1 | 8/2017 |

OTHER PUBLICATIONS

International Patent Application No. PCT/CA2019/051692, International Preliminary Report on Patentability dated Jun. 10, 2021.
(Continued)

*Primary Examiner* — Peter M Poon
*Assistant Examiner* — Daniel Wasil
(74) *Attorney, Agent, or Firm* — Louis B. Allard

(57) ABSTRACT

A closed loop heat convection cooling system for nuclear reactors. The cooling system is formed outside the containment structure of the nuclear reactor. The cooling system has cooling assemblies that are housed in protective structures, which shield the cooling assemblies from projectile impact. Air inlet and outlet apertures are formed in the protective structures to cause outside air to be drawn into the protective structures to passively cool the cooling assemblies.

19 Claims, 6 Drawing Sheets

(51) Int. Cl.
*G21C 11/00* (2006.01)
*G21C 13/02* (2006.01)
*G21C 15/22* (2006.01)

(58) Field of Classification Search
USPC .......................... 376/273, 277, 287, 298, 299
See application file for complete search history.

(56) References Cited

OTHER PUBLICATIONS

International Patent Application No. PCT/CA2019/051692, International Search Report and Written Opinion dated Jan. 30, 2020.

* cited by examiner

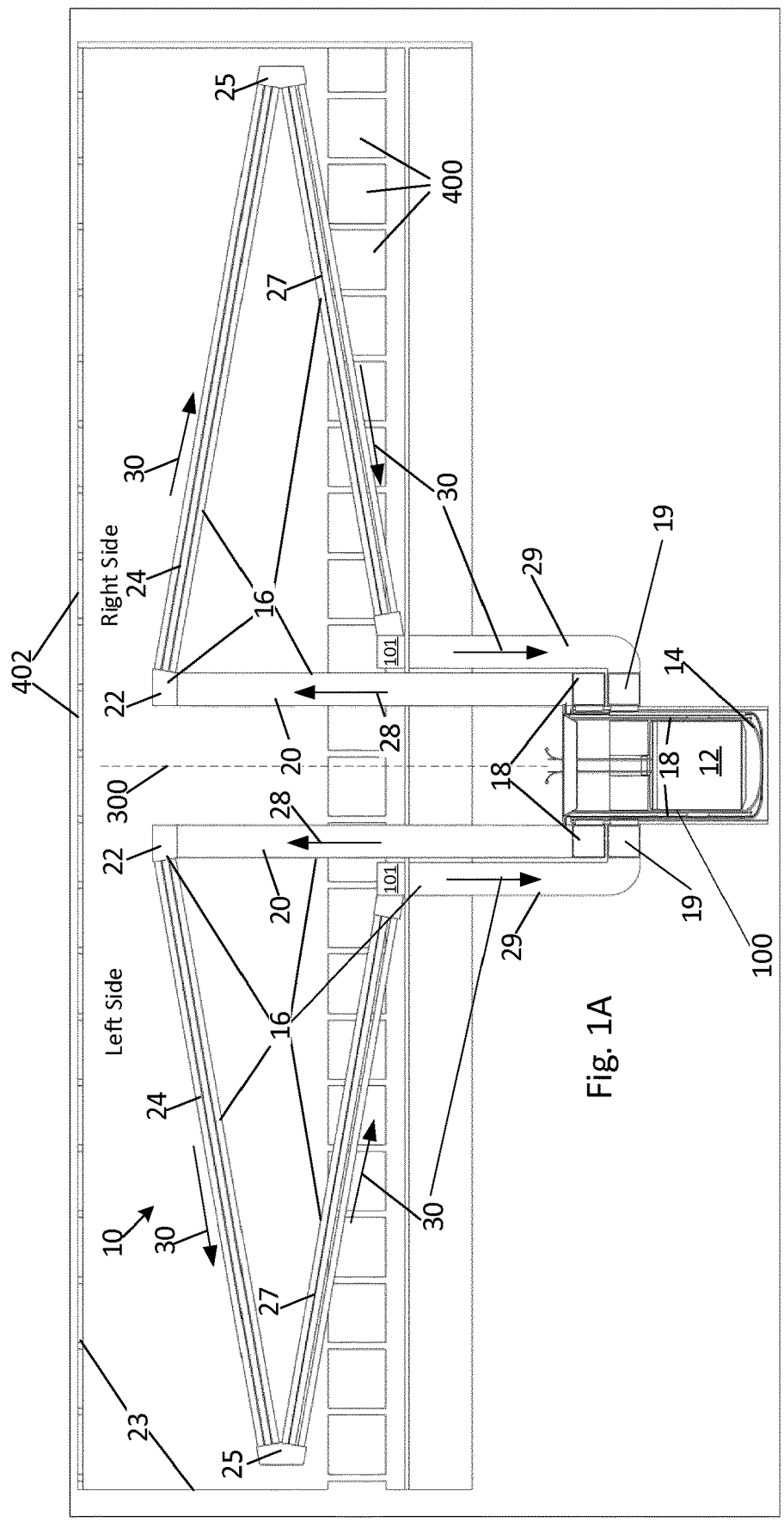

EXTERNAL CLOSED-LOOP NUCLEAR REACTOR COOLING ASSEMBLY ENCLOSED IN A PROTECTIVE STRUCTURE

TECHNICAL FIELD

The present disclosure relates to cooling systems for nuclear reactors. In particular, the present disclosure relates to a cooling system for removing decay heat from a reactor.

BACKGROUND

Decay heat is the residual heat given off by fission products after a nuclear reactor is shut down. It is a prime goal of nuclear safety to provide adequate decay heat removal in all foreseeable situations. In traditional water cooled, solid fueled reactors this can be achieved through engineered safety systems that provide a continuous supply of water to ensure the solid fuel remains submerged in water.

Some attempts to include more passive safety aspects have proposed directing outside air to remove heat directly from the nuclear reactor's Containment Structure, which is defined by the United States Nuclear Regulatory Commission (USNRC) as "A gas-tight shell or other enclosure around a nuclear reactor to confine fissure products that might be released to the atmosphere in the event of an accident. Such enclosures are usually dome-shaped and made of steel-reinforced concrete". Another important term is Confinement Systems, which the USNRC refers to as "those systems, including ventilation, that act as barriers between areas containing radioactive substances and the environment". Confinement systems thus refer to structures or barriers that impede transport of fission products either within the Containment structure or occasionally outside the Containment Structure.

In traditional, water cooled, solid fueled reactors the Containment Structure is very large in volume as there is the foreseen need to contain large quantities of steam along with fission products. In most Light Water Reactors (LWR) it is the steel-reinforced outer building itself that forms the gas-tight Containment Structure and the reactor itself and its primary loop are by definition confinement barriers.

In other systems, for example the Westinghouse AP-1000, there is s a steel Containment Structure that resides just within the AP-1000's outer reinforced concrete shield building. This allows the AP-1000, a pressurized water reactor, to incorporate some passive decay heat removal by directing a flow of outside air between the gap existing between steel Containment Structure and the outer shield building. The steel Containment Structure has a very large volume in order to deal with steam production, as in light water reactor designs.

The types of reactors that do not employ water or high pressure gasses in their primary cooling cycle and thus, do not have to consider safety scenarios where large volumes of steam would be generated, can thus have tighter fitting and compact Containment Structures. Such reactors include, for example, liquid metal cooled reactors (Sodium or Lead) and Molten Salt Reactors. Both Molten Salt Reactors and Liquid metal cooled reactors have designs in which the decay heat of the fission process can be passively transported internally within their reactor vessel to the reactor vessel wall, which is itself a Confinement Barrier. In the case of liquid metal reactors, there is an internal natural circulation of a large volume of liquid metal through their solid nuclear cores and, in the case of Molten Salt reactors, there is or can be an internal natural circulation of the liquid molten salt fuel itself. If this heat can be transferred from the reactor vessel wall, to the Containment Structure and ultimately to a fail safe external heat sink such as atmospheric air itself, an attractively passive safety system is the result.

As an example, some Sodium Cooled reactors have a tight fitting Containment Structure and have proposed various methods of allowing the use of outside air to remove heat by directly flowing the outside air along the outside of the Containment Structure, thus in some ways similar to the later AP-1000 design. In most published examples, this has been achieved by directing a thermosyphoning flow of outside air past the tight fitting Confinement Structure, which in this case is a Guard Vessel surrounding the reactor vessel. The constantly replaced outside air being the ultimate heat sink of decay heat. Heat from the reactor vessel goes to the Confinement Structure (Guard Vessel) simply by thermal radiation through a gas filled gap. With the liquid sodium being at relatively high temperature (high emission of thermal radiation) and the fact that the overall power density within the reactor vessel is low (small core but large pool of sodium) this can be quite effective for decay heat removal.

An early specific example of the GE-Prism design proposed an added feature to the concept just described. It added an extra confinement barrier within the Containment Structure. It retained a guard vessel but this was no longer the Containment Structure. A small separation between the guard vessel and the now somewhat larger and taller Containment Structure allowed the use of a close cycle flow of gas to transport heat from the Guard Vessel to the steel Containment Structure. This in effect adds one further confinement barrier within Structural Containment and aids in marginally increasing the surface area of contact of the Containment Structure and the directed flow of outside air.

However, a drawback of such systems, is the relatively close proximity of a potential release pathway of radioactivity to the environment in a severe accident scenario. The Containment Structure is being challenged to function as both a heat exchange medium and the main containment and final confinement barrier for fission product release. Another drawback, more specific to tight fitting Containment Structures is the potential activation of the passing outside air by neutrons emitted from the reactor and the creation of activated Argon 41. Whereas in sodium or lead cooled fast reactor concepts it can be easy to provide a thick, neutron absorbing layer of sodium or lead between the reactor core and the reactor vessel, in other potential use such as with Molten Salt Reactors (MSR) or Fluoride cooled High temperature Reactors (FHR), where decay heat can also be transmitted effectively to the reactor vessel wall, such internal neutron shielding is more problematic as is the activation of outside air.

Therefore, improvements in decay heat removal systems are desirable.

SUMMARY

In a first aspect, the present disclosure provides a cooling system for a nuclear reactor that is contained in a nuclear containment structure. The cooling system comprises a closed circuit formed outside the nuclear containment structure. The closed circuit is configured to have circulating therein a gas through heat convection. The closed circuit has a receiving portion positioned to receive gas heated by thermal contact with the nuclear reactor; and a return portion positioned to provide gas cooled by the cooling system back in thermal contact with the nuclear reactor. The closed circuit further has a plurality of cooling assemblies coupled to the receiving portion and to the return portion. Each cooling assembly of the plurality of cooling assemblies comprises a group of conduits located along a same section of the closed circuit and interconnecting a first header to a second header. The group of conduits is configured for the gas circulating therein to move toward the return portion. The cooling system further comprises a plurality of protective structures that are distinct from the plurality of cooling assemblies. Each protective structure of the plurality of protective structures encloses one or more than one cooling assembly of the plurality of cooling assemblies to shield the one or more than one cooling assembly from projectile impact. Each protective structure of the plurality of protective structures has a pair of flat, spaced apart walls between which the group of conduits of the one or more than one cooling assembly are disposed. Each protective structure of the plurality of protective structures defines an air inlet aperture and an air outlet aperture. The air inlet aperture and the air outlet aperture are configured for circulation of air through their respective protective structure to cool the group of conduits of the one or more than one cooling assembly disposed in the respective protective structure.

In some embodiments, the conduits of the group of conduits include conduits that may be linear, parallel, coextensive and spaced apart.

In some embodiments, the plurality of protective structures may be horizontally spaced apart from each other.

In some embodiments, the plurality of protective structures may consist of two protective structures.

In some embodiments, each protective structure of two protective structures may enclose two cooling assemblies of the plurality of cooling assemblies.

In some embodiments, a horizontal distance spacing two protective structures of the plurality of protective structures may be at least 20 meters.

In some embodiments, the group of conduits may have at least two hundred conduits, each conduit of the two hundred conduits may have a diameter of at least 8 centimeters and a length of at least 10 metres.

In some embodiments, the cooling system may comprise a riser coupled to the receiving portion and to the first header, and a downcomer coupled to the second header and to the return portion.

In some embodiments, the air inlet aperture and the air outlet aperture may be open to the atmosphere.

In some embodiments, the conduits of the group of conduits may extend from the first header to the second header at an oblique angle.

In some embodiments, the oblique angle may be comprised between 2° and 10° from a horizontal plane.

In some embodiments, the cooling system may comprise a third header, wherein at least one cooling assembly of the plurality of cooling assemblies has another group of conduits located along a respective same section of the closed circuit and interconnecting one of the first header and the second header to the third header.

In some embodiments, at least one of the protective structures of the plurality of protective structures may enclose only two cooling assemblies of the plurality of cooling assemblies.

In some embodiments, the only two cooling assemblies may be disposed symmetrically to one another, with respect to a vertical plane.

In some embodiments, each cooling assembly may be configured to, on its own, remove decay heat from the nuclear reactor to meet a pre-determined decay heat removal safety criteria.

In some embodiments, the cooling system may be configured to operate during operation of the nuclear reactor and during shutdown of the nuclear reactor.

In some embodiments, the cooling system may be configured to preclude any gas that is not in the closed circuit from circulating within reach of neutrons emitted from the nuclear reactor.

In another aspect, the present disclosure provides a cooling system for a nuclear reactor. The nuclear reactor is contained in a nuclear containment structure. The cooling system comprises a closed circuit formed outside the nuclear containment structure, the closed circuit configured to have circulating therein a gas through heat convection. The closed circuit has a receiving portion positioned to receive gas heated by thermal contact with the nuclear reactor. The closed circuit also has a return portion positioned to provide gas cooled by the cooling system back in thermal contact with the nuclear reactor; and, the closed circuit has a plurality of cooling assemblies coupled to the receiving portion and to the return portion, each cooling assembly of the plurality of cooling assemblies comprises a heat exchanger assembly located between the receiving portion and the return portion. The heat exchanger assembly is configured for the gas circulating therein to move toward the return portion. The cooling system also comprises a plurality of protective structures distinct from the plurality of cooling assemblies. Each protective structure of the plurality of protective structures encloses one or more than one cooling assembly of the plurality of cooling assemblies to shield each exchanger system of each of the one or more than one cooling assembly from projectile impact. Each protective structure of the plurality of protective structures has a pair of flat, spaced apart walls between which each heat exchanger assembly of the one or more than one cooling assembly is disposed. And, each protective structure of the plurality of protective structures defining an air inlet aperture and an air outlet aperture, the air inlet aperture and the air outlet aperture being configured for circulation of air through their respective protective structure to cool provide cooling to each heat exchanger assembly of the one or more than one cooling assembly disposed in the respective protective structure.

In a further aspect of the present disclosure, there is provided a cooling system for a nuclear reactor. The cooling system comprises a receiving portion positioned to receive gas heated by thermal contact with the nuclear reactor. The cooling system also comprises a return portion positioned to provide gas cooled by the cooling system back in thermal contact with the nuclear reactor. The cooling system further has a plurality of cooling assemblies coupled to the receiving portion and to the return portion. Each cooling assembly of the plurality of cooling assemblies comprises conduits through which the gas circulates, in a same direction, toward the return portion. Each cooling assembly is part a closed circuit configured for the gas to circulate therein through heat convection. The cooling system also has a plurality of protective structures distinct from the plurality of cooling assemblies. Each protective structure of the plurality of protective structures encloses one or more than one cooling assembly of the plurality of cooling assemblies to shield the one or more than one cooling assembly from projectile impact, and each protective structure of the plurality of protective structures has a pair of flat, spaced apart walls between which the conduits of the one or more than one cooling assembly are disposed.

In some embodiments, the plurality of conduits may include conduits that are linear, parallel, coextensive and spaced apart.

In some embodiments, the plurality of protective structures may be horizontally spaced apart from each other.

In some embodiments, a horizontal distance spacing two protective structures of the plurality of protective structures may be at least 20 meters.

In some embodiments, the cooling system may comprise a riser coupled to the receiving portion and a downcomer coupled to the return portion.

In some embodiments, the plurality of protective structures may each define an air inlet aperture and an air outlet aperture, the air inlet aperture and the air outlet aperture being configured for circulation of air through their respective protective structure to cool the one or more than one cooling assembly disposed in the respective protective structure.

In some embodiments, at least one cooling assembly of the plurality of cooling assemblies may have a single group of conduits that are linear, parallel, coextensive and spaced apart.

BRIEF DESCRIPTION OF THE FIGURES

FIG. 1A shows an elevation view of a nuclear reactor system that includes an embodiment of a cooling system in accordance with the present disclosure.

DETAILED DESCRIPTION

The cooling system of the present disclosure has a closed loop through which a cooling fluid circulates under the effect of heat convection. The cooling system is formed outside the containment structure of a nuclear reactor and the structure of the cooling system prevents gas that is not in the closed circuit to approach the reactor within neutron radiation distance. The cooling systems has cooling assemblies that are housed in protective structures, which shield the cooling assemblies for projectile impact. Air inlet and outlet apertures are formed in the protective structures to cause outside air to be drawn into the protective structures to cool the cooling assemblies. The cooling system of the present disclosure allows for decay heat removal from a nuclear core of a nuclear reactor when the nuclear reactor cesses to operate due to unforeseen conditions such as, for example, loss of electrical power to pumps circulating the primary coolant in the nuclear reactor. In some embodiments, the cooling system of the present disclosure is always functioning. That is, the cooling system continuously extracts heat from the nuclear core. In these embodiments, the cooling system does not need to be actuated in any way when the nuclear reactor shuts down unexpectedly. The heat extracted by the cooling system during operation of the nuclear reactor is wasted instead of being used externally to perform work (e.g. to power an electrical generator). However, the fraction of the heat wasted can be of the order of 1% or less, which can be seen as being a small cost to pay for the benefit of having increased control over decay heat management. As an additional benefit, always having the cooling system running helps cool the silo/building environment in which the nuclear reactor is disposed, which keeps the reactor vessel (the vessel that contains the nuclear core) at a lower operating temperature.

In some embodiments, the cooling of the system of the present disclosure includes redundant cooling structures that continue to cool the nuclear reactor in the event where one of the cooling structures becomes inoperable. Additionally, each of these redundant cooling structures can be housed in spaced-apart distinct concrete housings for added protection again catastrophic event such as a plane crash and projectile impacts, which are likely, in some cases, to affect only one of the redundant cooling structures.

Alternatively, in other embodiments, the cooling system of the present disclosure can be actively or passively activated. For example, in such embodiments, shut-off valves (or any other suitable type of closures) can be installed in the individual pipes in the cooling system and configured to open upon loss of electrical power. Opening of the shut-off valves allows the cooling system to effectively remove decay heat when needed. In other embodiments, the shut-off valves can be controlled by an operator and actuated at any time.

Figure 1B:
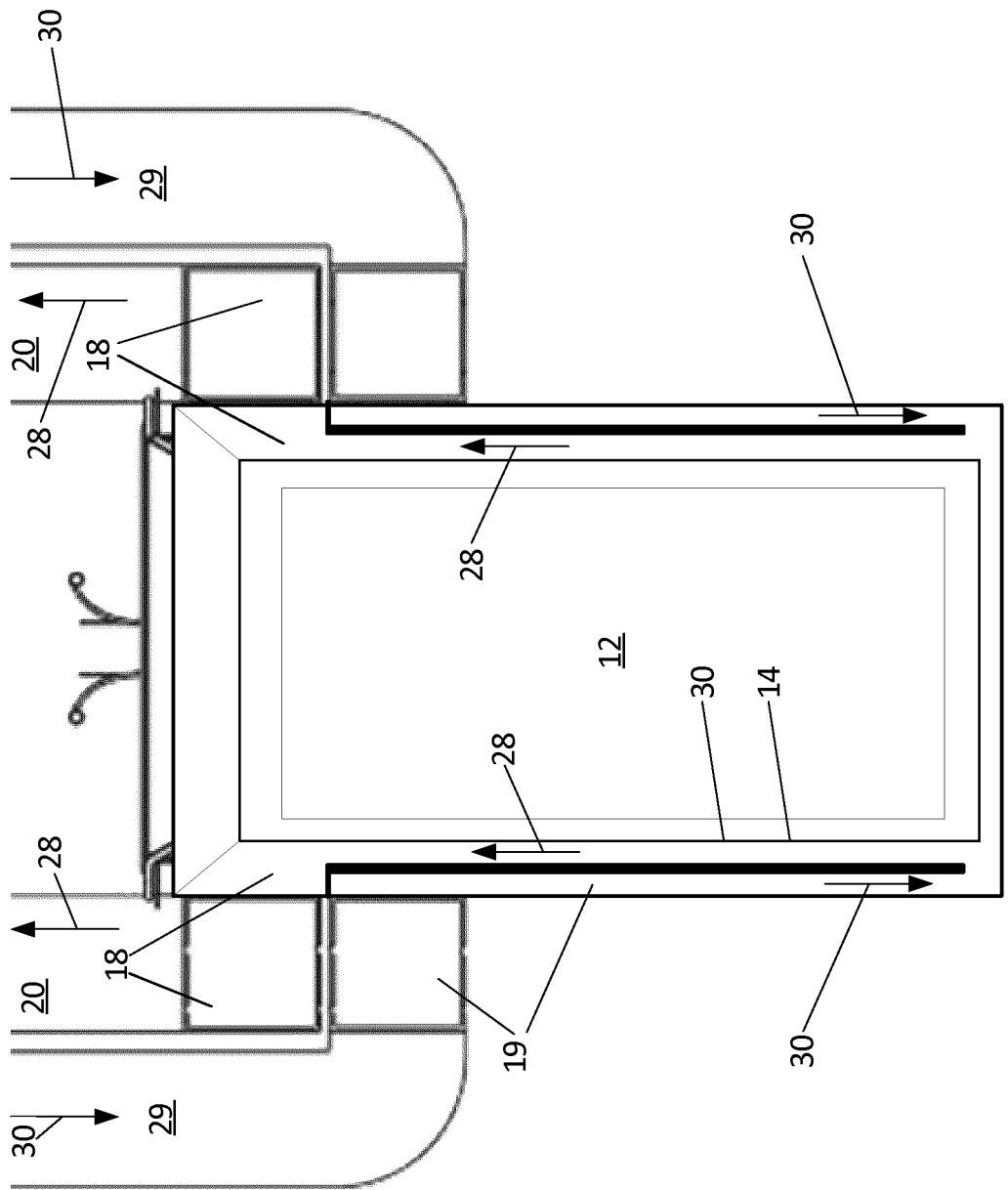
FIG. 1B shows a cut away elevation view the nuclear reactor system of FIG. 1A.

FIG. 1A shows an elevation view of an embodiment of a nuclear reactor system 10 that comprises a cooling system in accordance with the present disclosure. The nuclear reactor system 10 has a reactor 12 (reactor vessel that contains the reactor core) contained in containment structure 100, which can also be referred to as a nuclear containment structure. The containment structure includes a guard vessel 14. The reactor 12 can be any suitable type of nuclear reactor such as, for example, a molten salt nuclear reactor. The guard vessel 14 is in thermal contact with the reactor 12. That is, some heat generated by the reactor 12 is transferred to the guard vessel 14, by heat radiation, conduction, and/or convection. In other embodiments that are within the scope of the present disclosure, there may not be a guard vessel. FIG. 1B shows a partial, cutaway view of the containment structure 100, which includes the guard vessel 14. In addition to the guard vessel 14, in some embodiments, the containment structure may include a vault (not shown) in which spent nuclear fuel is kept. In other embodiments, the containment structure may also include ducts connecting the guard vessel 14 to vault and/or connecting the guard vessel to another guard vessel in which another nuclear reactor is placed. In FIG. 1, the arrows 28 and 30 indicate the direction of flow of the gas in the cooling systems 16. Arrows 28 indicate gas that is rising while arrows 30 indicate gas that is descending.

In the embodiment of FIG. 1A, the nuclear reactor system 10 has a cooling system that comprises two cooling assemblies 16, which each include multiple conduits (e.g., pipes) that define a closed circuit in which a fluid (a coolant fluid) can circulate though the effect of thermal heat convection. The cooling system that comprises the two cooling assemblies 16 is formed outside the nuclear containment structure 100. The advantages of having the cooling assemblies 16 formed outside the nuclear containment structure 100 include retaining a tight fitting, low volume containment structure while allowing for significant volume and large surface area to heat rejection to the outside atmosphere. The fluid can be a single phase fluid such as a gas or, can be a two phase fluid. In the context of the present disclosure, a sealed closed circuit is a circuit that retains the fluid circulating therein without releasing the fluid to the atmosphere. The sealed closed circuit is not in fluid communication with the atmosphere during operation of the cooling system. However, the sealed closed circuit may have access ports to insert and/or remove fluid in/from the sealed closed circuits when the cooling system is not in operation. In the context of the present disclosure, having fluid communication between objects or spaces means that there is a path for fluid to flow between the objects or spaces.

Further, in the embodiment shown in FIG. 1A, the multiple conduits that are part of the cooling assemblies 16 are not in the reactor 12 itself and the heat removed by the cooling assemblies 15 is not used to perform work. That is, the multiple conduits are formed outside the nuclear reactor. As such, the fluid circulating in the multiple conduits is not a coolant used to remove heat from the nuclear reactor core and to transfer that heat to electrical generators or any device that can perform work.

Each cooling assembly 16 has a receiving portion 18 (the receiving portion can be referred to as a bottom portion or as a heat source portion) that is in thermal contact with the reactor 12 and/or the guard vessel 14. That is, the receiving portion 18 is formed and positioned outside the guard vessel 14 and is configured to receive heat generated by the reactor 12 and/or the guard vessel 14, through heat radiation, conduction, and/or convection. The heat generated by the nuclear core is transmitted out of the nuclear reactor core through the vessel wall of the nuclear reactor 12 and though the wall of the guard vessel 14. The gas present and/or circulating in the cooling system 16, at the receiving portion 18, is in thermal contact with the nuclear reactor 12 and is heated by the nuclear reactor 12, i.e. is heated by the heat received from the reactor 12 and/or the guard vessel 14. The heated gas at the receiving portion 18 will naturally tend to rise in the cooling system 16. To be clear, the receiving portion 18 is positioned to receive gas heated by thermal contact with the nuclear reactor 102.

The receiving portion 18 can have any suitable form. For example, the receiving portion 18 can be cylinder-shaped with a diameter selected to surround the reactor 12 and/or the guard vessel 14. A cylinder-shaped receiving portion 18 can have, in some embodiments a flooring portion disposed beneath the reactor 12 and/or the guard vessel 14. The receiving portion 18 does not need to be cylinder-shaped.

The cooling assemblies 16 each comprise a riser portion 20 coupled (connected) to the receiving portion 18. The riser portion 20 extends vertically to allow the gas heated by thermal contact with the nuclear reactor 12 and received at the receiving portion 18 to rise. The riser portion 20 can consist in a single duct (single conduit, single pipe), or can comprises more than one duct, each connected to the receiving portion 18. The riser portion 20 can extend vertically at any suitable angle that allows heated gas to rise. The cooling system 16 further comprises a header 22 that connects the riser portion 20 to a plurality of conduits 24 (pipes, tubes, ducts), which are downwardly inclined. The plurality of conduits 24 are disposed along a same section/portion of the closed circuit and of their respective cooling assembly 16. As such, the gas heated at the bottom portion 18 moves (rises), by heat convection, in the riser portion 20, transferring heat out of the riser portion 20 while it rises. The gas reaches the header 22, enters the plurality of conduits 24, and continues to cool as it propagates downwards in the plurality of conduits 24. The plurality of conduits 24 can extend from the header 22 at any suitable angle. For example, in some embodiments, the angle can be an oblique angle in a range from 2 to 10 degrees, as measured from an horizontal plane or line.

The plurality of conduits 24 in the embodiment of FIG. 1 are linear (straight), parallel, coextensive and spaced apart. Other embodiments, where the plurality of conduits are not all linear (straight), parallel, coextensive and spaced apart, are considered to be within the scope of the present disclosure.

As the heated gas moves from the receiving portion 18 toward the plurality of conduits 24, it dissipates heat to the environment surrounding the cooling assemblies 16 and cools. The materials used for the various portions of the cooling assemblies 16 can be selected to allow optimal heat transfer from the cooling system to the environment that is in contact with the various portions of the cooling system. For example, the material can be, in some embodiments, stainless steel or mild steel.

In the embodiment of FIG. 1, the plurality of conduits 24 are connected at one end to the header 22 and at the other end, to a header 25. The header 25 is also connected to a series of conduits (e.g., pipes) 27, which are inclined downwardly and extend toward a downcomer portion 29 to which they are connected. The series of conduits 27 connect to the downcomer 29 through a heads 101. The series of conduits 27 are disposed along a same section/portion of the closed circuit and of their respective cooling assembly 16. The downcomer 29 portion can consist in a single duct, or can comprises more than one duct, each coupled (connected) to the bottom portion 18. As such, the hot gas that has cooled while circulating upward in the riser portion 20, toward the plurality of conduits 24 and downward in the plurality of conduits 24 is then directed towards where it started its ascent. That is, the cooled gas in the plurality of conduits 24 is directed to a return portion 19 of the cooling system 16 through the series of conduits 27. The return portion 19 is positioned to return the cooled gas back to the outside of the guard vessel 14 so that it can be in thermal contact with the nuclear reactor 12 to heat the cooled gas and repeat/maintain the cooling cycle.

The series of conduits 27 in the embodiment of FIG. 1A are linear (straight), parallel, coextensive and spaced apart. Other embodiments where the series of conduits 27 are not all linear (straight), parallel, coextensive and spaced apart, are considered to be within the scope of the present disclosure.

The conduits in the plurality of conduits 24 and in the series of conduits 27 and be similar conduits with similar dimensions and similar heat transfer properties. In other embodiments, rather than having a series of conduits 27 connecting the header 25 to the downcomer 29 portion, there may be a single duct (not shown) connecting the header 25 to the downcomer 29 portion. The single duct can have any suitable cross section geometry such as, for example, a rectangular cross section geometry, or an ellipsis cross section geometry. The single duct can have any suitable cross section geometry such as, for example, a rectangular cross section geometry, or an ellipsis cross section geometry.

In the above embodiments as well as in the other embodiments described herein, the conduits 24 and/or the conduits 27 may each have a circular cross section and an outer diameter of about 10 cm. The conduits 24 and/or conduits 27 may be grouped in a rectangular cross section area of about 4 m by 2 m. The pipes 24 and/or conduits 27 may be spaced apart by about 16 cm (i.e., pitch of 16 cm), which results in a total of about 330 conduits 24 and/or 330 conduits 27 interconnecting a header 22 to a connector junction 25, or interconnecting a connector junction 25 to a downcomer 29. The conduits 24 and/or the conduits 27 may have any suitable length, such as, for example, 20 m. In some embodiments, the conduits 24 and/or conduits 27 may be grouped in groups of at least 200 conduits.

Having the plurality of conduits 24 interconnecting the header 22 to the header 25 offers a greater heat exchange surface area than if instead, a single duct or conduit having an inner volume equal to that of the sum of the inner volumes of the plurality of pipes 24 were used to interconnect the header 22 to the connector junction 25. As such, from a cooling perspective, having a plurality of conduits as described above is advantageous over having a single duct.

In the above described embodiments, when the cooling system is in operation, gas present in any conduit of the plurality of conduits 24 circulates (flows) in the same direction as gas present in any other conduit of the plurality of conduits 24. Further, in the above described embodiments, gas present in any conduit of the plurality of conduits 27 circulates (flows) in the same direction as gas present in any other conduit of the plurality of conduits 27. Furthermore, when the cooling system is in operation, gas present in the cooling assemblies 16 between the receiving portion 18 and the return portion 19 flows (moves) toward the return portion 19.

As shown at FIG. 1A, the plurality of conduits 24 are slanted towards the outer periphery of the nuclear reactor system 10. The cooling assemblies 16 in FIG. 1A are housed in a protective structure 23, which can be made of concrete and/or steel, and which is configured to withstand projectile impact, aircraft impact, hurricane storms, etc. The protective structure 23 is configured to shield the cooling assemblies 16 from projectile impact, aircraft impact, hurricane storms, etc. As will be described below, the protective structure 23 has a pair of spaced apart walls (e.g. flat walls) between which the conduits (24, 27) of the cooling assemblies 16 are disposed (located).

In the embodiment of FIG. 1A, the protective structure 23 is provided with a plurality outside air inlets 400 and a plurality of air outlets 402, which allow air to enter the concrete structure 23 and circulate in the concrete structure 23, to cool the cooling assemblies 16. Protective structures with any number of air inlets 400 and air outlets 402 are considered to be within the scope of the present disclosure.

The embodiment of the cooling assemblies 16 shown in FIG. 1 are bilaterally symmetrical with respect to an axis 300. Embodiments where there is no such symmetry are to be considered as being within the scope of the present disclosure.

In some embodiments, the cooling system of the present disclosure can be configured to have redundancy in that if one cooling assembly were to become inoperable, the remaining cooling assembly would suffice to provide adequate cooling to the nuclear reactor 12. For example, if a conduit in the plurality of conduits 24 or a conduit in the series of conduits 27 were to become blocked or broken, the remaining conduits would remain operable. As another example, with respect to the cooling system embodiment shown at FIG. 1A, if the entire right side or the entire left side of the cooling system, the left side cooling assembly 16 or the right side cooling assembly 16, were to become inoperable, the remaining side, which is designed to accommodate the entire cooling requirements of the reactor 12, would continue to provide sufficient cooling to the reactor 12.

In the cooling system embodiment shown at FIG. 1A, the reactor 12 is located immediately below the cooling system 16. However, this need not be the case. Rather, the reactor 12 can be located at the same level as in FIG. 1A but at a distance from the center of the cooling system. The distance can be such that access to the reactor is unobstructed by the cooling system.

Figure 2:
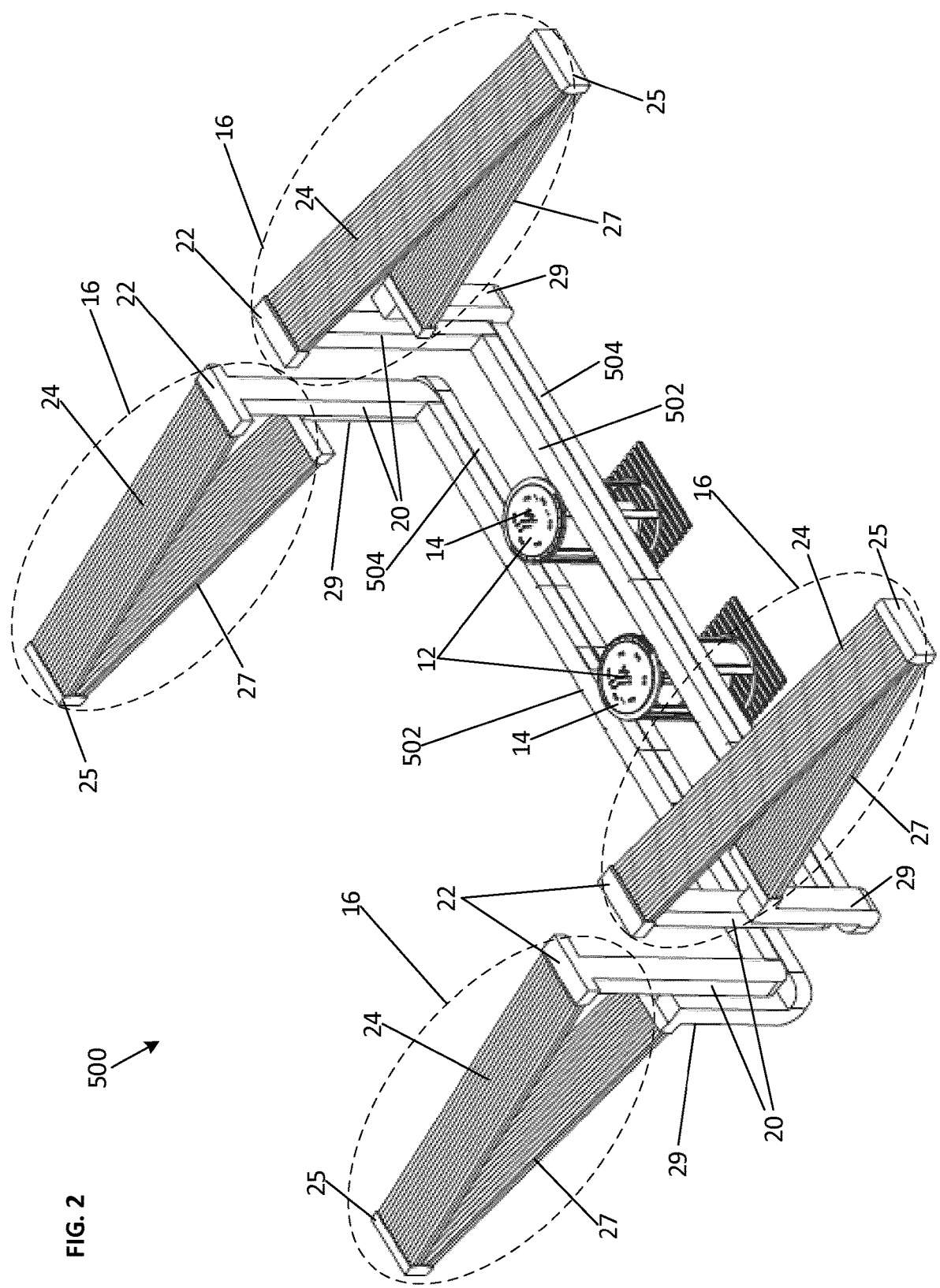
FIG. 2 shows a perspective view of a cooling system in accordance with the present disclosure.

FIG. 2 shows a perspective view of another embodiment of a cooling system in accordance with the present disclosure. In this embodiment, there are two reactors 12 and a cooling system 500 that includes four cooling assemblies 16 of the embodiment shown at FIG. 1A. In other embodiments, rather than two reactors, there can be a single reactor 12 connected to the cooling system 500. In FIG. 2, one of reactors 12 is active while the other reactor is a spent reactor cooling off after having been active for a number of years.

In the embodiment of FIG. 2, the two reactors 12 are connected to all four cooling assemblies 16 and every component of the cooling system 500 is in fluid communication with every other component of the cooling system 500, and the cooling system defines a closed circuit that is formed outside the nuclear containment structure or structures that contain the two nuclear reactors. In other embodiments, not shown, the cooling assemblies 16 can be configured to have no fluid communication between them.

Further, in the embodiment of FIG. 2, the four cooling assemblies 16 are interconnected through the conduits 502 and 504. Heated fluid travels away from the guard vessel 14 and reactors 12 in the conduits 502. Cooled fluid travels toward the guard vessels 14 and reactors 12 in the conduits 504.

Figure 3:
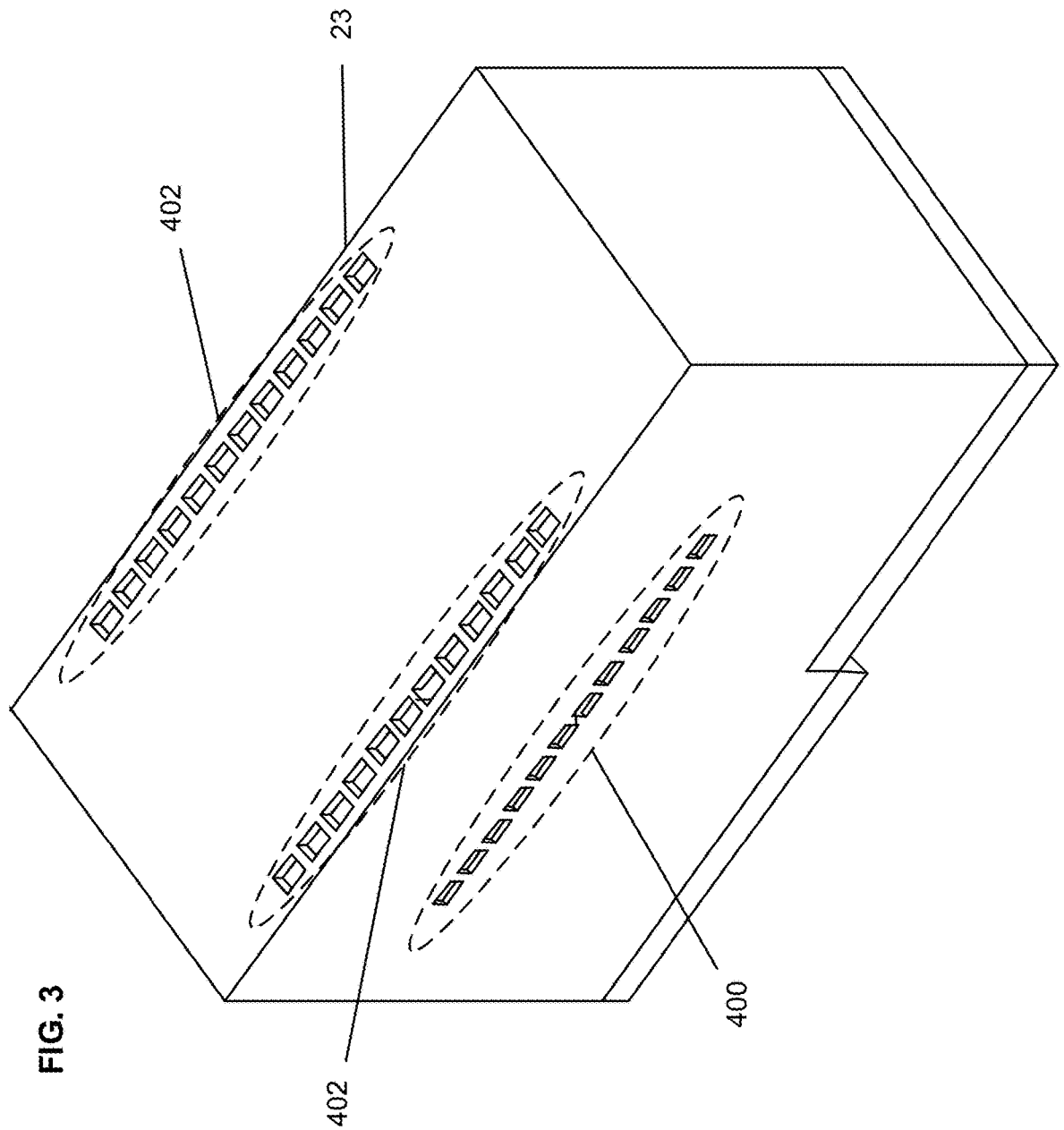
FIG. 3 shows a perspective view of an embodiment of a concrete structure housing a cooling system in accordance with the present disclosure.

FIG. 3 shows a perspective view of the concrete structure 23 that can house the cooling system 500 shown in FIG. 2. FIG. 3 shows a plurality of outside air inlets 400 and a plurality of outside air outlets 402 for one of the pairs of cooling assemblies 16 housed in the concrete structure 23. FIG. 3 also shows another plurality of outside air outlets 402 for the other pair of cooling assemblies 16 housed in the concrete structure 23.

Figure 4:
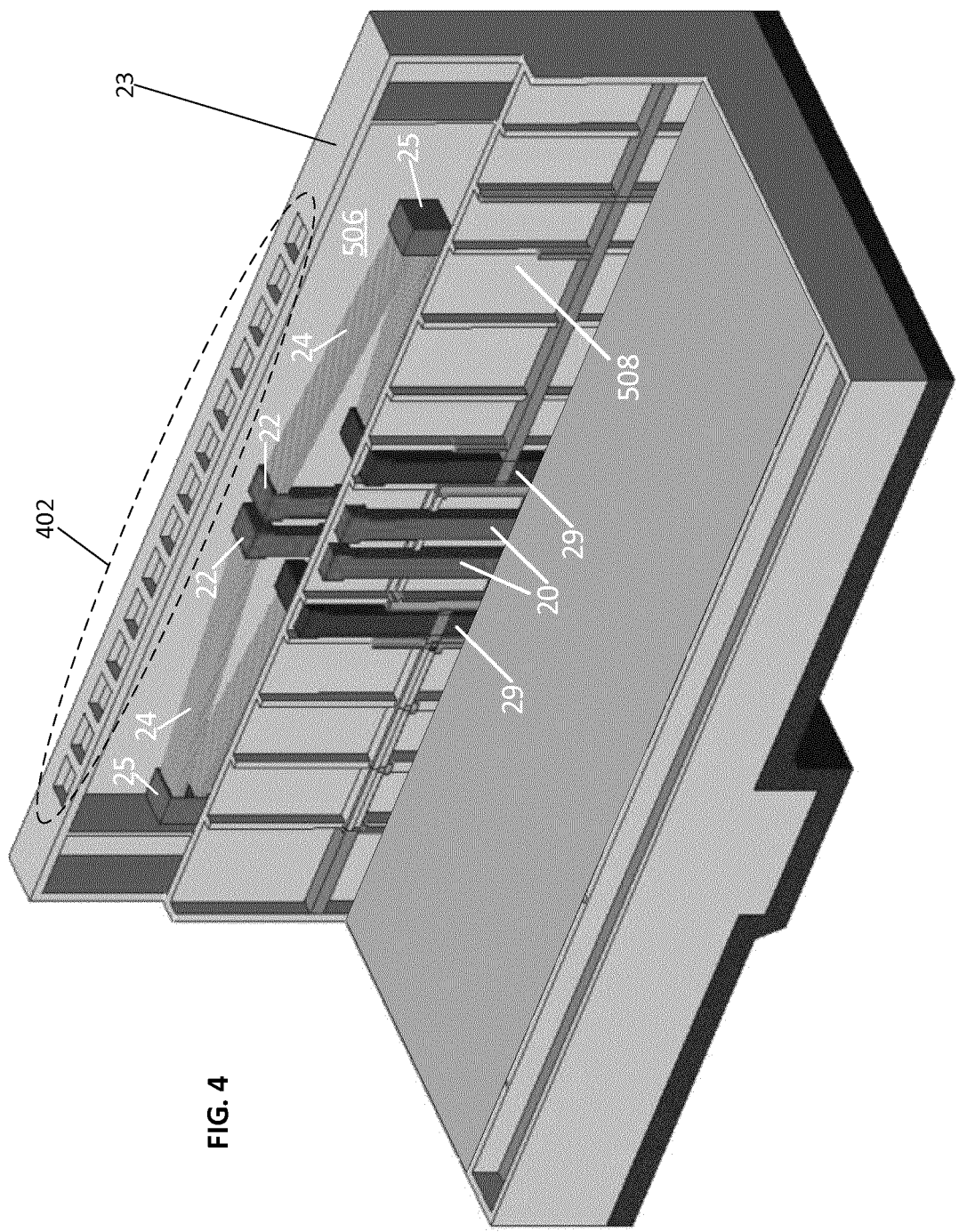
FIG. 4 shows a perspective cutaway view the concrete structure of FIG. 3.

FIG. 4 shows a perspective cutaway view the concrete structure 23 of FIG. 3. In FIG. 4, the components 22, 24 and 25 of one of the cooling assemblies 16 of the cooling system 500 shown in FIG. 2 are housed (disposed) between an outside wall 506 of the concrete structure 23 and an inside wall 508 of the concrete structure 23. The other cooling assemblies 16 are housed similarly between the respective opposite outside wall and inside wall. In the embodiment of FIG. 4, each pair of cooling assemblies 16 is individually housed (shielded) but can act independently if any one of the cooling assemblies 16 becomes damaged (e.g. when the cooling circuitry becomes blocked or when the cooling circuitry becomes open to the atmosphere) by an aircraft striking a side of the protective structure 23.

Each protective structure 23 has a pair of flat, spaced apart walls (506, 508) between which the group of conduits 24 of the two cooling assemblies 16 are disposed. Further, in the present embodiment, each protective structure 23 defines at least on an air inlet 400 aperture and at least one air outlet aperture 402, which are configured for circulation of air through their respective protective structure 23 to cool the conduits (24, 27) of the cooling assemblies disposed in the respective protective structure 23. The protective structures 23 are horizontally spaced apart from each other. The horizontal spacing between the protective structures can have any suitable value such as, for example, at least 20 meters. Horizontal spacing values that are not at least 20 meters are nevertheless to be considered to be within the scope of the present disclosure. It is not mandatory for the spaced apart walls to be flat. Rather, any wall shape that allows for the enclosing of cooling assemblies may be considered to be within the scope of the present disclosure.

As will be understood by the skilled worker, the conduits of the plurality of conduits 24 can be considered as a heat exchanger or as a heat exchanger assembly that is part of a respective cooling assembly.

A partial list of advantages of the cooling system of the present disclosure with respect to known cooling system is presented here:

- In some embodiment, the Cooling System is side mounted with double redundancy (i.e., two cooling assemblies). Only one of the two cooling assemblies is needed and if one of the cooling assemblies is damaged and/or destroyed, the other side can provide adequate cooling to the reactor
- By enclosing the cooling system within a concrete structure 23, protection is provided against missiles (in the general sense, aircraft, windblown debris, etc.)
- The pipes/conduits provide far larger surface area than flat plates or flat duct surfaces
- The air inlet apertures and the air outlet apertures of the concrete structure (protective structure) causes an updraft of outside air moving past the pipe/conduit array, this aids heat transfer
- The air moving past the spaces between pipes/conduits encourages far more turbulence than flat surfaces of ducts, which further aids heat transfer
- By having the pipes/conduits at an angle, this assures a constant driving force of natural circulation within the pipes and avoids fluid stagnation in any part of the pipes/conduits
- Pipe/conduit material is protected from rain and other weather
- Pipes/conduits have added functionality in terms of construction compared to the large amount of onsite welding that would be needed for flat plate arrangements
- Less fluctuation in system cooling capacity from varying solar or local wind that would be seen in a roof mounted cooling system As will be understood by the skilled worker, the cross-section area of the aforementioned portions of the cooling system 16 can be dimensioned to have the gas circulate, through the cooling system, at a constant speed. That is, as will be understood by the worker skilled in the art, cross-section areas of portions of the cooling system where the gas is cooler can be smaller than portions where the gas is hotter.

In other embodiments, instead of having a single phase coolant, such as a gas, it is possible to have a two phase coolant such as, for example, water. When such a two phase coolant is used, coolant in the liquid phase, present at the portion 18, extracts heat from the reactor 12 and/or guard vessel 14. Eventually, when the coolant has extracted a sufficient quantity of heat, it changes into the gas phase and begins moving towards the roof portion 24. At the roof portion 24, the coolant, having sufficiently cooled, returns to the liquid phase and drips down toward the portion 18, where the cycle is repeated. In some embodiments, it is possible for the coolant to change from the gas phase to the liquid phase prior to reaching the plurality of conduits 24, and to drip back toward the portion 18, in the same portion of the cooling system 18 through which the coolant—in the gas phase—rose.

As the cooling system 16 circulates a gas or liquid in close proximity to the nuclear reactor 12, the possibility of radioactive activation of the gas or liquid by neutrons escaping the reactor vessel exists. However as the cooling system 16 is a closed loop (closed circuit), it prevents any emission of activated products to the atmosphere. If and when there is a leak of any radioactive material from the reactor 12 into the cooling system 16, again, as the cooling system is designed as a closed loop, any release of radioactive material to the atmosphere can be avoided.

Further, in the event where a cooling system 16 should become open (e.g., breakage of one or more conduits) and air enter the cooling system, the cooling of the reactor 12 and/or guard vessel 14 would become more efficient and not lead to overheating of the reactor 12. That is, the removal of decay heat would not be adversely affected. In any such situation, the nuclear reactor can be shutdown to reduce to a negligible amount any neutron fluence reaching the cooling system 16. As such, if the now open cycle cooling system 16 is circulating air in the vicinity of the reactor (e.g., portion 18), very little radioactive activation products such as Argon 41 ($^{41}$Ar) would be produced and/or released to the atmosphere.

Furthermore, in the event where one side (e.g. a side adjacent an outside wall 506) of the cooling system 16 should become completely blocked, the cooling of the reactor 12 and/or guard vessel 14 is assured by the flow of gas now solely going to the opposite, still operational side cooling system 16 located adjacent the opposite outside wall of the concrete structure. This provides assurances of adequate cooling for the removal of decay heat should one side of the reactor building and one half of the cooling system 16 become damaged including complete blockage of one side. The cooling capacity of either side cooling system 16 is sufficient for decay heat removal requirements.

Figure 5:
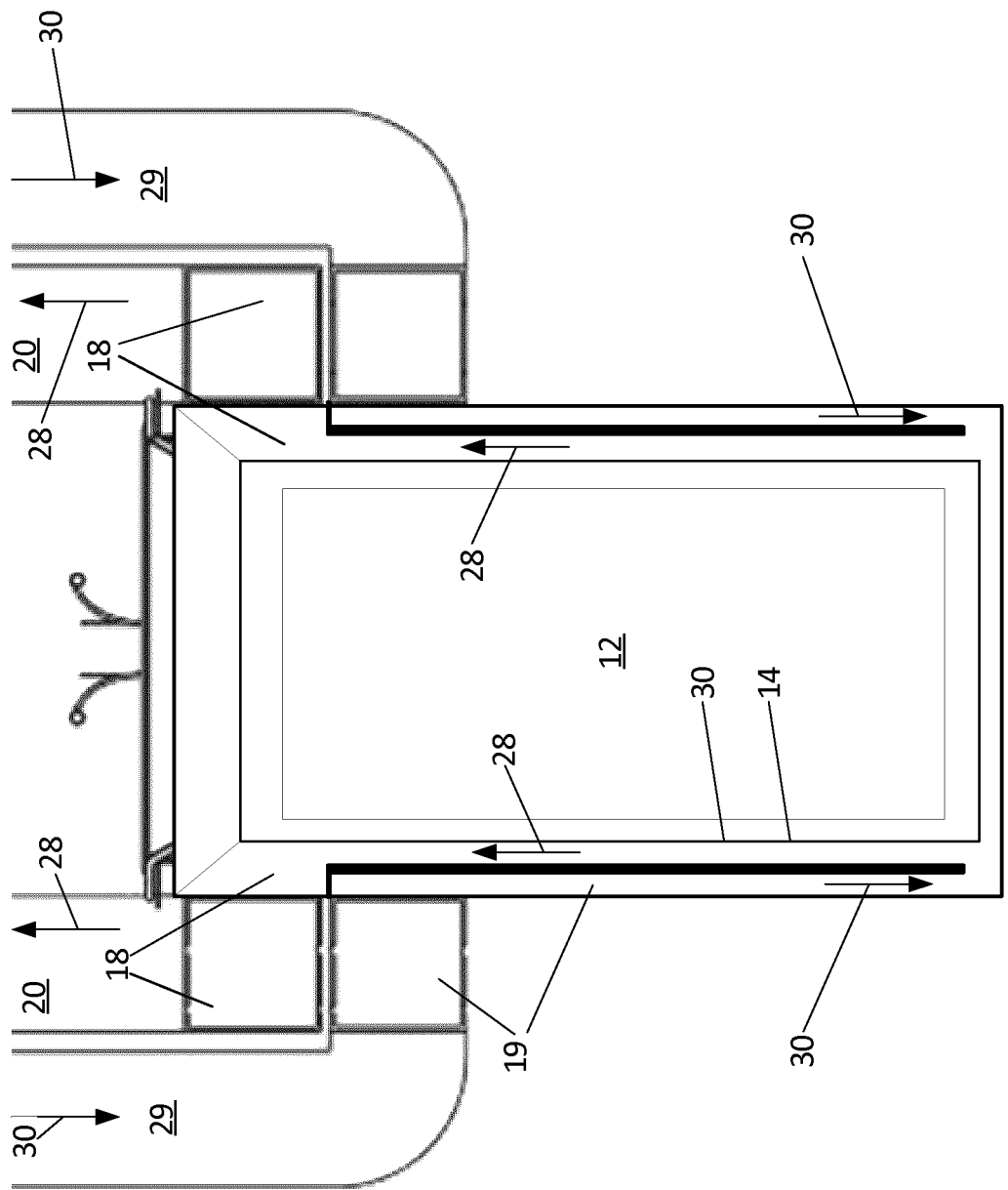
FIG. 5 shows a cutaway, elevation view of an embodiment of a receiving portion and of a return portion of a cooling assembly in accordance with the present disclosure.

FIG. 5 shows a cutaway, elevation view of an embodiment of a receiving portion and of a return portion of a cooling assembly in accordance with the present disclosure. Shown in this figure is the return portion 19 that receives cooled gas, which moves in the direction shown by the arrows 30, from the downcomer 30. The cooled gas enters the structure 21 that encloses the reactor 12 and moves downward along the partition 31 and beneath the partition 31, into the receiving portion 18. The gas is heated by the reactor 12 and ascends in the receiving portion 18 and into the riser portion 20. The heated gas moves in the direction indicated by the arrows 28.

In addition to cooling the guard vessel and/or the reactor itself, the cooling system of the present disclosure can be used to cool any other part of the facility in which the reactor is installed. For example, in some instances, the facility in question may have a section for storing spent nuclear fuel such as, for example, spent molten fuel salt. In such facilities, the cooling system used for cooling the reactor and/or guard vessel can be configured to also cool the area of the facility where the spent nuclear fuel is stored. In other embodiments, a separate cooling system can be used and the separate cooling system can be a duplicate or a scaled duplicate of the cooling used by the reactor and/or guard vessel.

The cooling system of the present disclosure allows for decay heat removal from a nuclear core of a nuclear reactor when the nuclear reactor cesses to operate due to unforeseen conditions such as, for example, loss of electrical power to pumps circulating the primary coolant in the nuclear reactor. In some embodiments, the cooling system of the present disclosure is always functioning, that is, is always extracting heat from the nuclear core, the cooling system does not need to be actuated in any way when the nuclear reactor shuts down unexpectedly. In these embodiments, the heat extracted by the cooling system during operation of the nuclear reactor is wasted instead of being used externally to perform work (e.g., to power an electrical generator). However, the fraction of the heat wasted can be of the order of 1% or less, which can be seen as being a small cost pay for the benefit of having increased control over decay heat management. In other embodiments, closures disposed in the cooling system allow the cooling system to be turned on and off, either automatically upon loss of electrical power or deliberately by an operator.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

The invention claimed is:

1. A cooling system for a nuclear reactor, the nuclear reactor being contained in a nuclear containment structure, the cooling system comprising:
   a closed circuit configured to be positioned outside the nuclear containment structure, the closed circuit further configured to have circulating therein a gas through heat convection, the closed circuit having:
      a receiving portion configured to be positioned at the nuclear containment structure to receive therefrom gas to be cooled by the cooling system;
      a return portion configured to be positioned at the nuclear containment structure to provide thereto gas cooled by the cooling system; and
      a plurality of cooling assemblies coupled to the receiving portion and to the return portion, each cooling assembly of the plurality of cooling assemblies comprising a group of conduits located along a same section of the closed circuit and interconnecting a first header to a second header, the group of conduits configured for the gas circulating therein to move toward the return portion;
      and
   a plurality of protective structures distinct from the plurality of cooling assemblies,
      each protective structure of the plurality of protective structures enclosing one or more than one cooling assembly of the plurality of cooling assemblies to shield the one or more than one cooling assembly from projectile impact,
      each protective structure of the plurality of protective structures having a pair of flat, spaced apart walls between which the group of conduits of the one or more than one cooling assembly are disposed, and
      each protective structure of the plurality of protective structures defining an air inlet aperture positioned on one of the pair of walls of the respective protective structure and an air outlet aperture positioned on the respective protective structure above the position of the inlet aperture, the air inlet aperture and the air outlet aperture being configured for passive circulation of air through their respective protective structure to passively cool the group of conduits of the one or more than one cooling assembly disposed in the respective protective structure.

2. The cooling system of claim 1, wherein conduits of the group of conduits include conduits that are linear, parallel, coextensive and spaced apart.

3. The cooling system of claim 1, wherein the plurality of protective structures are horizontally spaced apart from each other.

4. The cooling system of claim 3, wherein the plurality of protective structures consists of two protective structures.

5. The cooling system of claim 4, wherein each protective structure of two protective structures encloses two cooling assemblies of the plurality of cooling assemblies.

6. The cooling system of claim 4, wherein a horizontal spacing between two protective structures of the plurality of protective structures is at least 20 meters.

7. The cooling system of claim 6, wherein the group of conduits has at least two hundred conduits, each conduit of the two hundred conduits having a diameter of at least 8 centimeters and a length of at least 10 meters.

8. The cooling system of claim 1, further comprising a riser coupled to the receiving portion and to the first header, and a downcomer coupled to the second header and to the return portion.

9. The cooling system of claim 1, wherein the air inlet aperture and the air outlet aperture are open to the atmosphere.

10. The cooling system of claim 1, wherein the conduits of the group of conduits extend from the first header to the second header at an oblique angle.

11. The cooling system of claim 10, wherein the oblique angle is comprised between 2° and 10° from a horizontal plane.

12. The cooling system of claim 1, further comprising a third header, wherein at least one cooling assembly of the plurality of cooling assemblies has another group of conduits located along a respective same section of the closed circuit and interconnecting one of the first header and the second header to the third header.

13. The cooling system of claim 1, wherein at least one of the protective structures of the plurality of protective structures encloses only two cooling assemblies of the plurality of cooling assemblies.

14. The cooling system of claim 13, wherein the only two cooling assemblies are disposed symmetrically to one another, with respect to a vertical plane.

15. The cooling system of claim 1, wherein each cooling assembly is configured to, on its own, remove decay heat from gas received by the receiving portion to meet a pre-determined decay heat removal safety criteria.

16. The cooling system of claim 1, wherein the nuclear reactor is one of an operating nuclear reactor and a shutdown nuclear reactor.

17. A cooling system for a nuclear reactor, the nuclear reactor being contained in a nuclear containment structure, the cooling system comprising:
   a closed circuit configured to be positioned outside the nuclear containment structure, the closed circuit further configured to have circulating therein a gas through heat convection, the closed circuit having:
      a receiving portion configured to be positioned at the nuclear containment structure to receive therefrom gas to be cooled by the cooling system;
      a return portion configured to be positioned at the nuclear containment structure to provide thereto gas cooled by the cooling system; and
      a plurality of cooling assemblies coupled to the receiving portion and to the return portion, each cooling assembly of the plurality of cooling assemblies comprising a heat exchanger assembly located between the receiving portion and the return portion, the heat exchanger assembly configured for the gas circulating therein to move toward the return portion; and a plurality of protective structures distinct from the plurality of cooling assemblies, each protective structure of the plurality of protective structures enclosing one or more than one cooling assembly of the plurality of cooling assemblies to shield each heat exchanger assembly of each of the one or more than one cooling assembly from projectile impact, each protective structure of the plurality of protective structures having a pair of flat, spaced apart walls between which each heat exchanger assembly of the one or more than one cooling assembly is disposed, and each protective structure of the plurality of protective structures defining an air inlet aperture positioned on one of the pair of walls of the respective protective structure and an air outlet aperture positioned on the respective protective structure above the position of the inlet aperture, the air inlet aperture and the air outlet aperture being configured for passive circulation of air through their respective protective structure to provide passive cooling to each heat exchanger assembly of the one or more than one cooling assembly disposed in the respective protective structure.

18. A cooling system for a nuclear reactor, the cooling system comprising:

a receiving portion configured to be positioned at the nuclear reactor to receive therefrom gas to be cooled by the cooling system;

a return portion configured to be positioned at the nuclear reactor to provide thereto gas cooled by the cooling system;

a plurality of cooling assemblies coupled to the receiving portion and to the return portion, each cooling assembly of the plurality of cooling assemblies comprising conduits through which the gas circulates, in a same direction, toward the return portion, each cooling assembly being part a closed circuit configured for the gas to circulate therein through heat convection;

a plurality of protective structures distinct from the plurality of cooling assemblies, each protective structure of the plurality of protective structures enclosing one or more than one cooling assembly of the plurality of cooling assemblies to shield the one or more than one cooling assembly from projectile impact, each protective structure of the plurality of protective structures having a pair of flat, spaced apart walls between which the conduits of the one or more than one cooling assembly are disposed, and each protective structure of the plurality of protective structures defining an air inlet aperture defined by one wall of the pair of walls of the respective protective structure and an air outlet aperture defined by the respective protective structure above the position of the inlet aperture, the air inlet aperture and the air outlet aperture being configured for passive circulation of air through their respective protective structure to provide passive cooling to the conduits of the one or more than one cooling assembly disposed in the respective protective structure.

19. The cooling system of claim 18, wherein the plurality of conduits include conduits that are linear, parallel, coextensive and spaced apart.

* * * * *